United States Patent
Noda et al.

(10) Patent No.: US 10,688,434 B2
(45) Date of Patent: *Jun. 23, 2020

(54) GAS SEPARATION METHOD

(71) Applicant: NGK INSULATORS, LTD., Nagoya-Shi (JP)

(72) Inventors: Kenichi Noda, Nagoya (JP); Takeshi Hagio, Inazawa (JP)

(73) Assignee: NGK Insulators, Ltd., Nagoya (JP)

(*) Notice: Subject to any disclaimer, the term of this patent is extended or adjusted under 35 U.S.C. 154(b) by 101 days.

This patent is subject to a terminal disclaimer.

(21) Appl. No.: 15/623,446

(22) Filed: Jun. 15, 2017

(65) Prior Publication Data
US 2017/0282118 A1 Oct. 5, 2017

Related U.S. Application Data

(63) Continuation of application No. PCT/JP2015/083374, filed on Nov. 27, 2015.

(30) Foreign Application Priority Data

Dec. 26, 2014 (JP) .................................. 2014-266013

(51) Int. Cl.
*B01D 53/22* (2006.01)
*B01D 71/02* (2006.01)

(52) U.S. Cl.
CPC ........... *B01D 53/22* (2013.01); *B01D 71/021* (2013.01); *B01D 71/027* (2013.01);
(Continued)

(58) Field of Classification Search
CPC .... B01D 53/22; B01D 71/021; B01D 71/027; B01D 71/028; B01D 2257/102; B01D 2257/108; B01D 2257/11; B01D 2311/13
See application file for complete search history.

(56) References Cited

U.S. PATENT DOCUMENTS 3,735,558 A * 5/1973 Skarstrom .............. B01D 53/22
                                                         95/51
5,202,023 A * 4/1993 Trimmer ................ B01D 53/22
                                                        210/321.8
(Continued)

FOREIGN PATENT DOCUMENTS

JP        08-091805 A1      4/1996
JP        10-001302 A1      1/1998
(Continued)

OTHER PUBLICATIONS

R. Krishna et al., "Insights into Diffusion of Gases in Zeolites Gained from Molecular Dynamics Simulations," *Microporous and Mesoporous Materials*, vol. 109, 2008, pp. 91-108.
(Continued)

*Primary Examiner* — Jason M Greene
(74) *Attorney, Agent, or Firm* — Burr & Brown, PLLC

(57) ABSTRACT

The gas separation method is executed under a condition in which a partial pressure of a first gas (G1) in a feed gas that contains at least mutually different gases being the first gas (G1) and a second gas (G2) becomes less than or equal to a total pressure of a permeate-side space (S2) of a gas separation membrane (30). The gas separation method includes a step of causing flow of a sweep gas that contains at least a third gas (G3) being a different gas from the first gas (G1) and the second gas (G2) into the permeate-side space (S2) of the gas separation membrane (30) while supplying a feed gas to a feed-side space (S1) of the gas separation membrane (30). The permeation rate of the first gas (G1) in the gas separation membrane (30) is greater than the permeation rate respectively of the second gas (G2) and the third gas (G3).

3 Claims, 2 Drawing Sheets

(52) U.S. Cl.
CPC ...... *B01D 71/028* (2013.01); *B01D 2257/102* (2013.01); *B01D 2257/108* (2013.01); *B01D 2257/11* (2013.01); *B01D 2311/13* (2013.01)

(56) References Cited

U.S. PATENT DOCUMENTS

| | | | |
|---|---|---|---|
| 5,507,856 | A | 4/1996 | Rao et al. |
| 2004/0170557 | A1 | 9/2004 | Asen et al. |
| 2005/0011358 | A1 | 1/2005 | Yamada et al. |
| 2011/0182797 | A1* | 7/2011 | Wilcox ............... B01D 53/228 423/359 |
| 2013/0253250 | A1* | 9/2013 | Gulyansky ........... B01D 53/226 585/818 |
| 2014/0345457 | A1* | 11/2014 | Balster ................ B01D 53/225 95/53 |
| 2015/0151242 | A1 | 6/2015 | Nagano et al. |
| 2015/0352481 | A1* | 12/2015 | Forsyth .............. B01D 53/047 95/96 |

FOREIGN PATENT DOCUMENTS

| | | | |
|---|---|---|---|
| JP | 2004-050129 A1 | 2/2004 | |
| JP | 2004-529838 A | 9/2004 | |
| JP | 2005-169233 A | 6/2005 | |
| JP | 2007-137787 A1 | 6/2007 | |
| JP | 2009-106912 A1 | 5/2009 | |
| JP | 2009-233608 A1 | 10/2009 | |
| JP | 2010-240622 A1 | 10/2010 | |
| JP | 2012-66242 * | 4/2012 | ............ B01D 53/22 |
| JP | 2012-066242 A1 | 4/2012 | |
| JP | 2013-107076 A1 | 6/2013 | |
| WO | 2014/007140 A1 | 1/2014 | |

OTHER PUBLICATIONS

International Search Report and Written Opinion (Application No. PCT/JP2015/083374) dated Jan. 12, 2016.
English Translation of Written Opinion, International Application No. PCT/JP2015/083374, dated Jul. 6, 2017 (8 pages).
Japanese Office Action (with English translation), Japanese Application No. 2016-566057, dated Jun. 4, 2019 (7 pages).

* cited by examiner

GAS SEPARATION METHOD

TECHNICAL FIELD

The present invention relates to a gas separation method using a sweep gas.

BACKGROUND ART

A typical method is known of causing flow of a sweep gas into the permeate-side of a gas separation membrane in a configuration in which a feed gas that contains two or more gases is supplied to a feed-side of a gas separation membrane and a predetermined gas contained in the feed gas permeates the permeate-side of the gas separation membrane (for example reference is made to Cited References 1 and 2). This method enhances the permeation efficiency by reducing the partial pressure of the permeate gas on the permeating side.

CITATION LIST

Patent Literature

[Patent Literature 1] Japanese Patent Application Laid Open No. 2004-50129

[Patent Literature 2] Japanese Patent Application Laid Open No. 2007-137787

SUMMARY OF THE INVENTION

Technical Problem

However, a typical gas separation method using a sweep gas has not been directed to a feature of enhancing the permeation efficiency of the components of the sweep gas. In particular, there is a need for enhancement of the permeation efficiency when using a sweep gas since the partial pressure of the predetermined gas in the feed gas tends to become less than or equal to the total pressure in a permeate-side space when a small amount of the predetermined gas that permeates the gas separation membrane is contained in the feed gas.

The present invention is proposed in light of the situation described above, and has the purpose of providing a gas separation method that enables enhancement of the permeation efficiency of a gas separation membrane.

Solution to Problem

The gas separation method according to the present invention is executed under a condition in which a partial pressure of a first gas in a feed gas that contains at least mutually different gases being the first gas and a second gas becomes less than or equal to a total pressure of a permeate-side space of a gas separation membrane. The gas separation method according to the present invention includes a step of causing flow of a sweep gas that contains at least a third gas that is a different type to the first gas and the second gas in the permeate-side space of the gas separation membrane while supplying the feed gas to a feed-side space of the gas separation membrane. A permeation rate of the first gas is greater than respective permeation rates of the second gas and the third gas in the gas separation membrane.

Effect of Invention

The present invention enables the provision of a gas separation method that enables enhancement of the permeation efficiency of a gas separation membrane.

DESCRIPTION OF EMBODIMENTS

Figure 1:
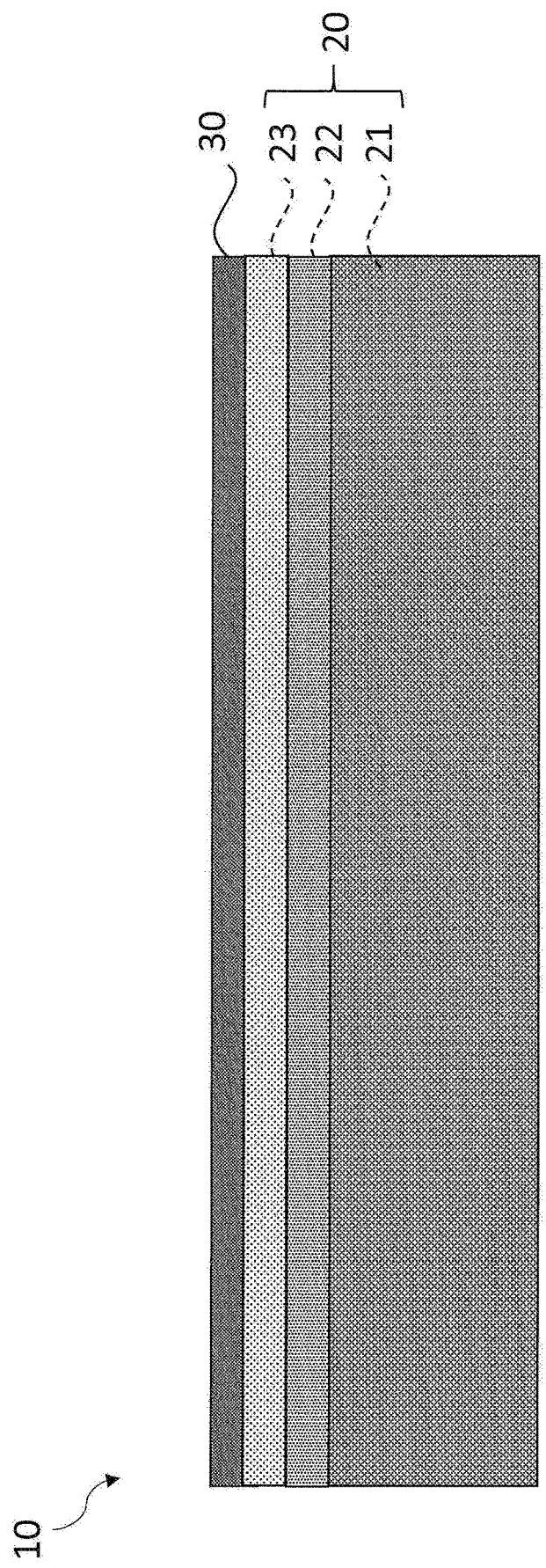
FIG. 1 is a cross sectional view illustrating a separation membrane structure.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different between the figures.

Configuration of Gas Separation Membrane Structure 10

The gas separation membrane structure 10 includes a porous support 20 and a gas separation membrane 30.

The porous support 20 supports the gas separation membrane 30. The porous support 20 may be configured in a shape to enable supply of a feed gas that is the object to be separated to the gas separation membrane 30, and for example, may be configured in a honeycomb, monolithic, flat, tubular, cylindrical, columnar, and square column shape, or the like. The porous support 20 includes a substrate 21, an intermediate layer 22 and a surface layer 23.

The substrate 21 is configured from a porous material. The porous material includes for example, a sintered ceramic, a metal, an organic polymer, glass, carbon or the like. The sintered ceramic includes alumina, silica, mullite, zirconia, titania, yttria, silicon nitride, silicon carbide, or the like. The metal includes aluminum, iron, bronze, stainless steel, or the like. The organic polymer includes polyethylene, polypropylene, polytetrafluoroethylene, polysulfone, polyimide or the like.

The substrate 21 may include an inorganic binder. The inorganic binder may include use of at least one of titania, mullite, sinterable alumina, silica, glass frits, clay minerals, and sinterable cordierite.

The porosity of the substrate 21 may be configured as 25% to 50%. The average particle diameter of the porous material that configures the substrate 21 may be 5 microns to 100 microns. The average pore diameter of the substrate 21 may be 5 microns to 25 microns. The average pore diameter of the substrate 21 can be measured using a mercury porosimeter. In the present embodiment, the term "average particle diameter" denotes the value of the arithmetic mean for the maximum diameter of 30 measured particles that are measured by cross sectional micro-structure observation by use of a scanning electron microscope (SEM).

The intermediate layer 22 is formed on a surface of the substrate 21. The intermediate layer 22 is configured by the same porous material as that used the substrate 21. The thickness of the intermediate layer 22 may be configured as 30 microns to 300 microns. The porosity of the intermediate layer 22 may be configured as 20% to 60%. The average pore diameter of the intermediate layer 22 may be smaller than the average pore diameter of the substrate 21, and may be configured as 0.005 microns to 2 microns. The average pore diameter of the intermediate layer 22 may be measured by a perm-porometer.

The surface layer 23 is formed on a surface of the intermediate layer 22. The surface layer 23 is configured by a porous material that can be used in the substrate 21. The thickness of the surface layer 23 may be configured as 1 micron to 50 microns. The porosity of the surface layer 23 may be configured as 20% to 60%. The average pore diameter of the surface layer 23 may be smaller than the average pore diameter of the intermediate layer 22, and may be configured as 0.001 microns to 1 micron. The average pore diameter of the surface layer 23 may be measured by a perm-porometer.

The gas separation membrane 30 is formed on a surface of the surface layer 23. The average pore diameter of the gas separation membrane 30 may be smaller than the average pore diameter respectively of the substrate 21, the intermediate layer 22 and the surface layer 23. The average pore diameter of the gas separation membrane 30 may be suitably determined in response to the molecular diameter of the gas contained in the feed gas that selectively permeates the gas separation membrane 30. The average pore diameter of the gas separation membrane 30 may be measured using an air flow method as prescribed by ASTM F316 or a nano perm-porometer.

The gas separation membrane 30 can be configured from an inorganic material, a metallic material, an organic material, or a composite material of those materials. In consideration of heat resistant properties or organic-solvent resistant properties, it is preferred to configure the gas separation membrane 30 as an inorganic material including a zeolite membrane, a carbon membrane, a silica membrane or the like.

Method of Manufacturing Gas Separation Membrane Structure 10

A method of manufacturing a gas separation membrane structure 10 will be described below.

Firstly, a green body for the substrate 21 is formed by molding a material for the substrate 21 into a desired shape by use of an extrusion molding method, a press molding method, a slip cast method, or the like. Next, the green body for the substrate 21 is fired (for example, 900 to 1450 degrees C.) to thereby form the substrate 21.

Next, an intermediate layer slurry is prepared by using a ceramic material having a desired particle diameter to thereby form a green body for the intermediate layer 22 using the intermediate layer slurry on the surface of the substrate 21. Next, the green body for the intermediate layer 22 is fired (for example, 900 to 1450 degrees C.) to thereby form the intermediate layer 22.

Next, a surface layer slurry is prepared by using a ceramic material having a desired particle diameter to thereby form a green body for the surface layer 23 using the surface layer slurry on the surface of the intermediate layer 22. Next, the green body for the surface layer 23 is fired (for example, 900 to 1450 degrees C.) to thereby form the surface layer 23. The porous support 20 is completed as described above.

Next, a gas separation membrane 30 is formed on a surface of the surface layer 23. The method of formation of the gas separation membrane 30 may adopt a known and conventional method depending on the membrane type. A method of forming a zeolite membrane, a carbon membrane and a silica membrane is described in order below.

A method of forming a zeolite membrane will now be described. Firstly, after pre-coating zeolite as a seed crystal on the surface of the surface layer 23, the porous support 20 is immersed inside a pressure-resistant vessel containing a starting material solution that includes a silica source, an alumina source, an organic template, an alkali source and water or the like. Next, the pressure-resistant vessel is placed in a drying oven and subjected to thermal processing (hydrothermal synthesis) for about 1 to 240 hours at 100 to 200 degrees C. to thereby form a zeolite membrane. Next, the porous support 20 formed the zeolite membrane is washed and dried at 80 to 100 degrees C. Then, the porous support 20 is placed in an electric furnace, and heated in an atmosphere of air at 400 to 800 degrees C. for 1 to 200 hours to thereby combust and remove the organic template.

Next a method of forming a silica membrane will be described. Firstly, tetraethoxysilane is subjected to hydrolysis in the presence of nitric acid to thereby form a sol solution, and is diluted with ethanol or water to thereby prepare a precursor solution (silica sol solution). Then, the precursor solution is brought into contact with the surface of the surface layer 23, the porous support 20 is heated to 400 to 700 degrees C. at a rate of 100 degrees C./hr and maintained for one hour, and then the temperature is allowed to fall at a rate of 100 degrees C./hr. A silica membrane is formed by 3 to 5 repetitions of the above steps.

Next a method of forming a carbon membrane will be described. Firstly, a thermo-curing resin such as an epoxy resin, polyimide resin, or the like, a thermoplastic resin such as polyethylene or the like, a cellulose resin, or precursor materials for these materials are dissolved in water or an organic solvent such as methanol, acetone, tetrahydrofuran, NMP, toluene, or the like to thereby prepare a precursor solution. The precursor solution is brought into contact with the surface of the surface layer 23, and thermal processing (for example, 500 to 1000 degrees C.) is performed depending on the type of resin contained in the precursor solution to thereby form a carbon membrane.

Method of Gas Separation using Gas Separation Membrane 30

Figure 2:
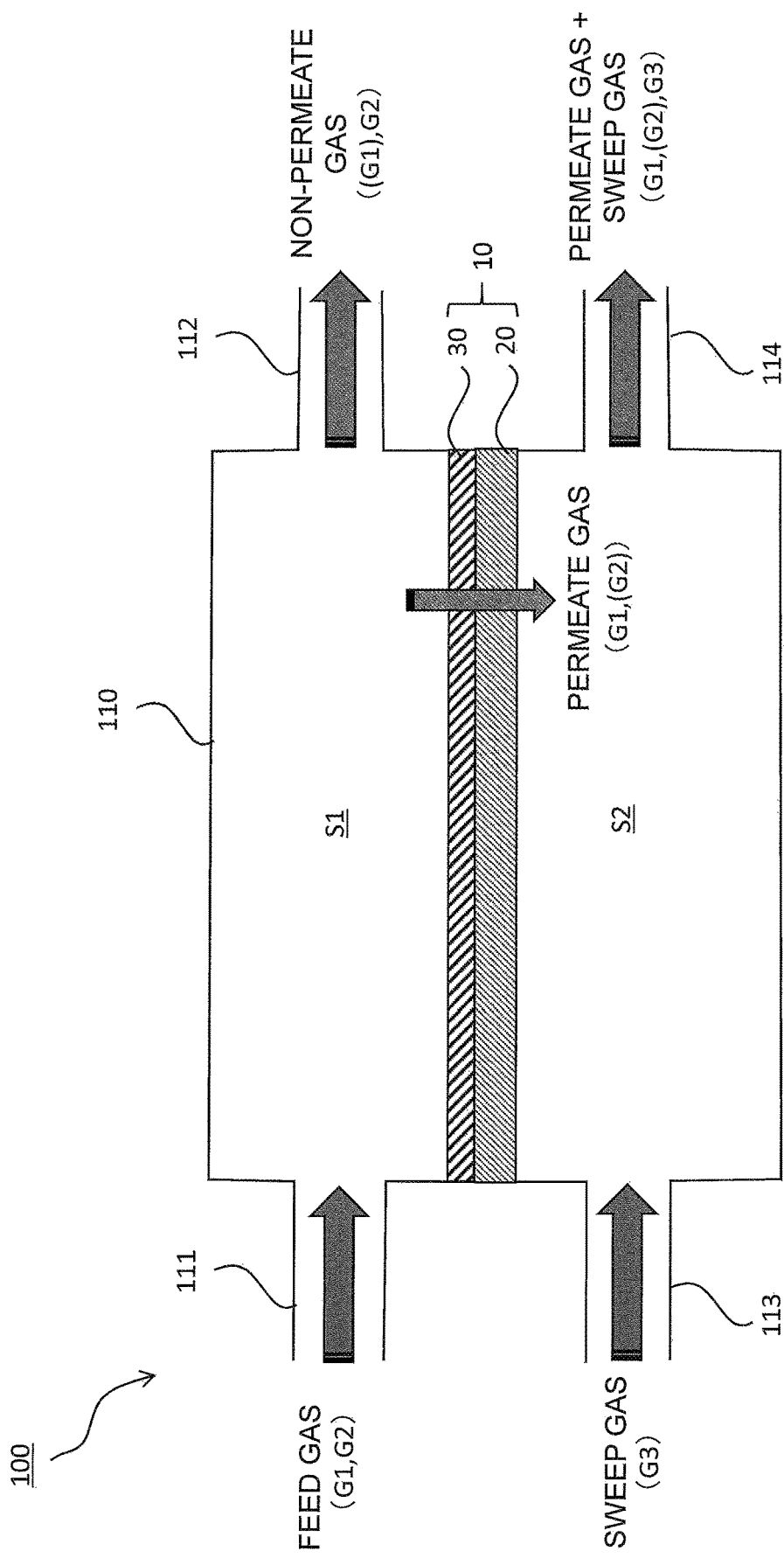
FIG. 2 is a cross sectional view of a gas separation module.

Next, a gas separation method using the gas separation membrane 30 will be described making reference to the drawings. FIG. 2 is a cross sectional view that schematically illustrates a configuration of a gas separation module 100 used in gas separation.

1. Configuration of Gas Separation Module 100

The gas separation module 100 includes a gas separation membrane structure 10 and a housing 110.

The gas separation membrane structure 10 is disposed in the housing 110. The gas separation membrane structure 10 includes the porous support 20 and the gas separation membrane 30. The gas separation membrane structure 10 partitions an inner cavity of the housing 110 into a feed-side space S1 and a permeate-side space S2.

The housing 110 includes a first feed pipe 111 and a first outlet pipe 112 connected to the feed-side space S1. The housing 110 includes a second feed pipe 113 and a second outlet pipe 114 connected to the permeate-side space S2.

The first feed pipe 111 is a passage for supply of the feed gas to the feed-side space S1. In the present embodiment, the feed gas is a mixed gas that at least contains a first gas G1 and a second gas G2. The first gas G1 and the second gas G2 are mutually different types of mono-component gases.

In this context, the first gas G1 is selectively recovered from the feed gas by the gas separation membrane 30. The first gas G1 thereby becomes included in the permeate gas that permeates the gas separation membrane 30. A small amount of the first gas G1 is contained in the feed gas.

Although there is no particular limitation in relation to the concentration of the first gas G1 in the feed gas, it may be configured as greater than or equal to 0.1% and less than or equal to 5.0%. When the concentration of the first gas G1 in the feed gas is less than 0.1%, membrane permeation may not be efficiently executed due to an excessively low partial pressure for the first gas G1. Furthermore, when the concentration of the first gas G1 in the feed gas is greater than 5.0%, the concentration of the first gas G1 in the feed gas may not be sufficiently reduced by membrane permeation. Furthermore, when the concentration of the first gas G1 in the feed gas is greater than 5.0%, the first gas G1 may be able to permeate the membrane in the absence of use of a sweep gas.

In this manner, if a sweep gas as described below does not flow into the permeate-side space S2 of the gas separation membrane 30 as a result of a low concentration of the first gas G1 in the feed gas, the membrane permeation amount of the first gas is limited by the membrane permeation amount of the second gas. As a result, when the partial pressure of the first gas becomes less than or equal to the total pressure of the permeate-side space S2, the first gas G1 displays a tendency to not permeate the gas separation membrane 30.

The molecular diameter of the first gas G1 is preferably smaller than the molecular diameter of the second gas G2. The molecular diameter of the first gas G1 is preferably smaller than the molecular diameter of the third gas G3 as described below. The molecular diameter of the first gas G1 is preferably less than or equal to average pore diameter of the gas separation membrane 30.

The second gas G2 is a gas that exhibits a tendency to not permeate the gas separation membrane 30 in comparison to the first gas G1. The permeation rate (permeance) of the first gas G1 in the gas separation membrane 30 is greater than the permeation rate of the second gas G2. The permeation rate is the amount of gas permeating the gas separation membrane 30 per unit pressure difference*unit membrane area*unit time, and is expressed in units of [mol/(m$^2$*s*Pa)].

More specifically, the ratio of permeation rates of the first gas G1 relative to the second gas G2 is preferably greater than or equal to 100. When the ratio of permeation rates of the first gas G1 relative to the second gas G2 is greater than or equal to 100, it is possible to further increase the concentration of the second gas G2 in the non-permeate gas. The molecular diameter of the second gas G2 is preferably larger than the molecular diameter of the first gas G1. Although there is no particular limitation on the concentration of the second gas G2 in the feed gas, it may be configured as greater than or equal to 50%. A concentration of the second gas G2 in the feed gas is preferably greater than or equal to 60%, and more preferably greater than or equal to 70%.

A gas other than the first gas G1 and the second gas G2 (for example, a gas that must be unavoidably mixed) may be included in the feed gas.

The following combinations are possible to a combination of the first gas G1 and the second gas G2.

A combination of hydrogen and methane
A combination of hydrogen and oxygen
A combination of hydrogen and carbon monoxide
A combination of hydrogen and carbon dioxide
A combination of helium and methane
A combination of helium and carbon dioxide
A combination of helium and oxygen
A combination of nitrogen and methane The first outlet pipe 112 is a passage for discharge of the non permeate gas of the feed gas that does not permeate the gas separation membrane 30 from the feed-side space S1. In the present embodiment, the non-permeate gas includes the second gas G2 as a main component. A configuration in which the second gas G2 is the main component means that the concentration of the second gas G2 in the non-permeate gas is greater than or equal to 50%.

The second feed pipe 113 is a passage for supply of the sweep gas to the permeate-side space S2. In the present embodiment, the sweep gas includes at least the third gas G3. The partial pressure of the first gas G1 in the permeate-side space S2 can be reduced by causing flow of a sweep gas into the permeate-side space S2.

In this context, the third gas G3 is a mono-component gas of a different type to the first gas G1 and the second gas G2. The permeation rate of the first gas G1 in the gas separation membrane 30 is greater than the permeation rate of the third gas G3. More specifically, the ratio of permeation rates of the first gas G1 relative to the third gas G3 is preferably greater than or equal to 100. When the ratio of permeation rates of the first gas G1 relative to the third gas G3 is greater than or equal to 100, it is possible to inhibit leakage of the third gas G3 into the non-permeate gas. The molecular diameter of the third gas G3 is preferably larger than the molecular diameter of the first gas G1. Although there is no particular limitation on the concentration of the third gas G3 in the sweep gas, it may be greater than or equal to 50%.

A minute amount of the third gas G3 may leak into the feed-side space S1 and become contained in the non-permeate gas. As a result, the third gas G3 is preferably a gas that exhibits no particular adverse effect even when mixed with the non-permeate gas. The third gas G3 includes for example nitrogen, carbon dioxide, water vapor, or the like.

The second outlet pipe 114 is a passage for discharge of the permeate gas and the sweep gas from the permeate-side space S2. In the present embodiment, the permeation gas includes the first gas G1, and the sweep gas includes the third gas G3. Therefore the first gas G1 and the third gas G3 are discharged through the second outlet pipe 114.

2. Method of Gas Separation

Next, the method of gas separation using the gas separation module 100 will be described.

The method of gas separation according to the present embodiment includes a step of causing flow of a sweep gas that contains the third gas G3 into the permeate-side space S2 while supplying the feed gas that includes the first gas G1 and the second gas G2 into the feed-side space S1.

At that time, since the concentration of the first gas G1 in the feed gas is low, if the sweep gas does not flow into the permeate-side space S2 of the gas separation membrane 30, it is not possible for the first gas G1 to efficiently permeate through the gas separation membrane 30.

In the present embodiment, the partial pressure of the first gas G1 in the permeate-side space S2 can be efficiently reduced by the flow of the sweep gas into the permeate-side space S2. Therefore, the first gas G1 can efficiently permeate the gas separation membrane 30.

Furthermore, since the permeation rate of the third gas G3 is smaller than the permeation rate of the first gas G1, it is possible to inhibit leakage of the third gas G3 that is contained in the sweep gas into the feed-side space S1.

Other Embodiments

Although an embodiment of the present invention has been described, the present invention is not limited to the above embodiment, and various modifications are possible within a scope that does not depart from the spirit of the invention.

For example, in the above embodiment, the porous support 20 includes the substrate 21, the intermediate layer 22 and the surface layer 23. However there is no limitation in this regard. The porous support 20 may omit one or both of the intermediate layer 22 and the surface layer 23.

In the above embodiment, an example of a configuration for the gas separation module 100 has been disclosed. However, suitable modification may be made in relation to the shape of the housing 110, the position and number of the feed pipe and outlet pipe, and the disposition of the gas separation membrane 30, or the like.

In the present embodiment, the feed gas includes the first gas G1 and the second gas G2. However the third gas G3 used in the sweep gas may also be included. In this configuration, it is preferred that the partial pressure of the third gas G3 in the feed-side space S1 is greater than or equal to the partial pressure of the third gas G3 in the permeate-side space S2. In this manner, the third gas G3 contained in the feed gas is caused to permeate to the permeate-side space S2 and it is possible to inhibit leakage of the third gas G3 contained in the sweep gas into the feed-side space S1. As a result, the concentration of the second gas G2 in the non-permeate gas can be increased.

EXAMPLES

The examples of the present invention will be described below. However, the present invention is not thereby limited to the following examples.
Preparation of Gas Separation Membrane Structure
1. Sample Nos. 1 and 2

In Sample Nos. 1 and 2, the gas separation membrane is formed as a DDR-type zeolite membrane.

Firstly, a monolithic-shaped substrate is prepared by firing a green body formed by an extrusion molding method. Next, an intermediate layer is formed having a thickness of 10 to 1000 microns and an average pore diameter of 0.1 to 3 microns by firing alumina particles having an average particle diameter of 0.3 to 10 microns that are deposited on an inner side surface of through holes formed in the substrate. Furthermore, a surface layer is formed having a thickness of 1 to 100 microns and an average pore diameter of 0.01 to 0.5 microns by firing alumina particles having an average particle diameter of 0.3 to 1 microns that are deposited on the intermediate layer. In this manner, a porous support having plural cells is completed.

Next, DDR-type zeolite seed crystals (Si/Al atomic ratio≥200) are diluted with ethanol, and the seeded slurry solution prepared to have a concentration of 0.1 mass % is caused to flow into the cells of the porous support. Next, the inner portion of the cells is air-dried using a drier to thereby dry the seeded slurry solution.

Then, after placing ethylene diamine in a fluororesin wide-mouth container, 1-adamantane amine is added and dissolved so that no 1-adamantane amine precipitate remains. Next, 30 wt % silica sol and distilled water are mixed in an another container, stirred gently, and added to the wide-mouth container and stirred for one hour to thereby prepare a sol for membrane formation. The resulting membrane-forming sol is placed in a fluororesin inner cylinder of a stainless steel pressure-resistant vessel, and the porous support with the DDR-type zeolite seed crystals attached is immersed and reacted for 24 hours in a hot air drying apparatus at a temperature of 160 degrees C. to thereby form a DDR-type zeolite membrane.

Then, the porous support is washed and dried for greater than or equal to 12 hours at 80 degrees C. Then, the porous support is heated to 450 degrees C. in an electric furnace and retained for 20 hours to thereby combust and remove the 1-adamantane amine from the DDR-type zeolite membrane.
2. Sample Nos. 3 to 8

A gas separation membrane is formed as a carbon membrane in Samples No. 3 to No. 8 below.

Firstly, a porous support having plural pores is prepared using the same method as that in Sample Nos. 1 and 2.

Next, helium gas is supplied under pressure of 50 kPa into the pores of the porous support and a precursor solution of a polyimide resin is formed as a membrane on an inner wall surface of the cells by an immersion method. Then, a carbon membrane is formed on the surface layer by carbonization of the precursor solution forming the membrane at a predetermined temperature (750 degrees C. in Sample Nos. 3 to 6, 650 degrees C. in Sample No. 7, and 700 degrees C. in Sample No. 8) in an atmosphere of nitrogen.
3. Sample Nos. 9 to 11

In Sample Nos. 9 to 11, the gas separation membrane is formed as a silica membrane.

Firstly, a porous support having plural pores is prepared using the same method as that in Sample Nos. 1 and 2.

Next, alumina particles having an average particle diameter of 0.01 to 0.3 microns that are deposited on the surface layer are fired to thereby form a UF layer having a thickness of 0.1 to 10 microns and an average pore diameter of 0.001 to 0.03 microns.

Then, a solution that is obtained by subjecting tetraethoxysilane to hydrolysis for 5 hours at 50 degrees C. in the presence of nitric acid is diluted using ethanol to thereby prepare a 1.0 wt % precursor solution calculated with reference to silica.

Then, the precursor solution is caused to flow into the cells of the porous support to thereby form a precursor solution membrane on the inner surface of the cells. Next, the inner portion of the cells is air-dried for one to two hours using a drier to thereby dry the precursor solution that is formed in a membrane. Then, thermal processing is performed in an electric furnace in an atmosphere of air at 600 degrees C. A silica membrane is formed on the UF layer by 4 repetitions of the steps from membrane formation of the precursor solution to firing in the electric furnace.

Gas Separation Testing

A gas separation module (reference is made to FIG. 2) that incorporates the gas separation membrane structure is used to perform gas separation test under the conditions shown in Table 1. It is noted that as stated above, the gas separation membrane structures in Sample Nos. 1 and 2 are mutually equivalent, the gas separation membrane structures in Sample Nos. 3 to 6 are mutually equivalent, and the gas separation membrane structures in Sample Nos. 9 to 11 are mutually equivalent.

TABLE 1

| Sample No. | Gas Separation Membrane | Feed Gas | | | | | Permeate-Side | First Gas Permeation Rate/ Second Gas | First Gas Permeation Rate/ Third Gas | Non-Permeate Gas | | |
|---|---|---|---|---|---|---|---|---|---|---|---|---|
| | | First Gas (mol %) | Second Gas (mol %) | Total Pressure (kPa) | First Gas Partial Pressure (kPa) | Third Gas (Sweep Gas) | Space Total Pressure (kPa) | Permeation Rate | Permeation Rate | First Gas (mol %) | Second Gas (mol %) | Third Gas (mol %) |
| 1 | DDR Membrane | Helium (1.0) | Methane (99.0) | 800 | 8 | Carbon Dioxide | 101 | 122 | 0.11 | Helium (0.7) | Methane (92.4) | Carbon Dioxide (6.9) |
| 2 | DDR Membrane | Helium (1.0) | Methane (99.0) | 800 | 8 | Nitrogen | 101 | 122 | 37 | Helium (0.7) | Methane (99.1) | Nitrogen (0.16) |
| 3 | Carbon Membrane | Helium (1.0) | Methane (99.0) | 800 | 8 | Nitrogen | 101 | 177 | 106 | Helium (0.7) | Methane (99.2) | Nitrogen (0.05) |
| 4 | Carbon Membrane | Helium (0.1) | Methane (99.9) | 800 | 0.8 | Nitrogen | 101 | 177 | 106 | Helium (0.07) | Methane (99.9) | Nitrogen (0.05) |
| 5 | Carbon Membrane | Helium (5.0) | Methane (95.0) | 800 | 40 | Nitrogen | 101 | 177 | 106 | Helium (3.5) | Methane (96.4) | Nitrogen (0.05) |
| 6 | Carbon Membrane | Helium (10.0) | Methane (90.0) | 800 | 80 | Nitrogen | 101 | 177 | 106 | Helium (7.2) | Methane (92.7) | Nitrogen (0.05) |
| 7 | Carbon Membrane | Helium (1.0) | Methane (99.0) | 800 | 8 | Nitrogen | 101 | 58 | 18 | Helium (0.7) | Methane (99.0) | Nitrogen (0.31) |
| 8 | Carbon Membrane | Helium (1.0) | Methane (99.0) | 800 | 8 | Nitrogen | 101 | 102 | 34 | Helium (0.7) | Methane (99.1) | Nitrogen (0.16) |
| 9 | Silica Membrane | Helium (2.0) | Oxygen (98.0) | 500 | 10 | Nitrogen | 101 | 114 | 160 | Helium (1.1) | Oxygen (98.1) | Nitrogen (0.8) |
| 10 | Silica Membrane | Hydrogen (2.0) | Oxygen (98.0) | 800 | 16 | Nitrogen | 101 | 143 | 202 | Hydrogen (0.8) | Oxygen (98.5) | Nitrogen (0.7) |
| 11 | Silica Membrane | Hydrogen (5.0) | Methane (95.0) | 500 | 25 | Carbon Dioxide | 101 | 200 | 105 | Hydrogen (2.9) | Methane (95.7) | Carbon Dioxide (1.4) |

As shown in Table 1, upon comparison of Sample No. 1 and Sample No. 2, it is confirmed that the concentration of the second gas in the non-permeate gas is enhanced by a configuration in which the permeation rate of the first gas is larger than the respective permeation rate of the second gas and the permeation rate of the third gas.

Furthermore upon comparison of Sample Nos. 2, 3, 7 and 8, it is confirmed that the concentration of the second gas in the non-permeate gas is enhanced as the permeation rate ratio of the permeation rate of the first gas to the permeation rate of the second gas increases, or as the permeation rate ratio of the permeation rate of the first gas to the permeation rate of the third gas increases.

In particular, it is confirmed that the concentration of the second gas in the non-permeate gas is enhanced by a configuration in which the permeation rate ratio of the permeation rate of the first gas relative to the permeation rate of the second gas is greater than or equal to 100, and the permeation rate ratio of the permeation rate of the first gas relative to the permeation rate of the third gas is greater than or equal to 100.

The superior result obtained in Sample Nos. 4 to 6 confirms that the above effect is obtained without reference to the concentration of the first gas in the feed gas. Furthermore, upon comparison of Sample Nos. 4 and 5 with Sample No. 6, it is confirmed that a configuration in which the concentration of the first gas in the feed gas is greater than or equal to 0.1% and less than or equal to 5.0% is particularly preferred.

Furthermore, the superior result obtained in Sample Nos. 9 to 11 confirms that the above result is obtained without reference to the combination of the first gas and the second gas that are contained in the feed gas.

Furthermore, the superior result obtained in all the samples in Sample Nos. 2 to 11 confirms that the above result is obtained without reference to the membrane type in the gas separation membrane.

DESCRIPTION OF THE REFERENCE NUMERALS

10 GAS SEPARATION MEMBRANE STRUCTURE
20 POROUS SUPPORT
21 SUBSTRATE
22 INTERMEDIATE LAYER
23 SURFACE LAYER
30 GAS SEPARATION MEMBRANE
100 GAS SEPARATION MODULE
110 HOUSING
111 FIRST FEED PIPE
112 FIRST OUTLET PIPE
113 SECOND FEED PIPE
114 SECOND OUTLET PIPE

The invention claimed is:
1. A gas separation method comprising:
causing flow of a sweep gas that contains at least a third gas into a permeate-side space of a gas separation membrane while supplying a feed gas that contains at least a first gas, a second gas and a third gas into a feed-side space of the gas separation membrane, wherein the first gas, the second gas and the third gas are mutually different gases,
a partial pressure of the first as in the feed gas supplied into the feed-side space of the gas separation membrane being less than or equal to a total pressure of the permeate-side space of the gas separation membrane, a partial pressure of the third gas in the feed-side space is greater than or equal to a partial pressure of the third gas in the permeate-side space, a permeation rate of the first gas is greater than the permeation rate respectively of the second gas and the third gas in the gas separation membrane, the first gas is any one of hydrogen, helium and nitrogen, a permeation rate ratio of the permeation rate of the first gas to the permeation ratio of the second gas is greater than or equal to 100, and a permeation rate ratio of the permeation rate of the first gas to the permeation rate of the third as is greater than or equal to 100.

2. The gas separation method according to claim 1, wherein a concentration of the first gas in the feed gas is greater than or equal to 0.1% and less than or equal to 5.0%.

3. The gas separation method according to claim 1, wherein a molecular diameter of the first gas is less than a molecular diameter respectively of the second gas and the third gas.

* * * * *